United States Patent
Takahashi

(10) Patent No.: US 7,458,353 B2
(45) Date of Patent: Dec. 2, 2008

(54) AUTOMATIC INTERNAL COMBUSTION ENGINE STOP DEVICE, INTERNAL COMBUSTION ENGINE PROVIDED WITH THE SAME AND AUTOMATIC INTERNAL COMBUSTION ENGINE STOP METHOD

(75) Inventor: Shigenori Takahashi, Anjo (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 69 days.

(21) Appl. No.: 11/709,050

(22) Filed: Feb. 22, 2007

(65) Prior Publication Data

US 2007/0199533 A1 Aug. 30, 2007

(30) Foreign Application Priority Data

Feb. 28, 2006 (JP) ............... 2006-052672

(51) Int. Cl.
*F02N 17/00* (2006.01)
*F02P 5/00* (2006.01)

(52) U.S. Cl. .................. 123/179.4; 123/406.47; 123/179.3

(58) Field of Classification Search ... 123/179.3–179.5, 123/198 DB, 102, 148, 406.47
See application file for complete search history.

(56) References Cited

U.S. PATENT DOCUMENTS 4,074,665 A 2/1978 Patis

| | | | |
|---|---|---|---|
| 6,504,259 B1 * | 1/2003 | Kuroda et al. | 290/40 C |
| 6,532,926 B1 * | 3/2003 | Kuroda et al. | 123/179.4 |
| 6,935,989 B2 * | 8/2005 | Shibagaki | 477/98 |
| 7,263,959 B2 * | 9/2007 | Kataoka et al. | 123/179.4 |
| 2003/0232696 A1 * | 12/2003 | Shibagaki | 477/76 |
| 2004/0084002 A1 * | 5/2004 | Mitsutani et al. | 123/179.4 |
| 2004/0216719 A1 | 11/2004 | Condemine et al. | |
| 2006/0048734 A1 * | 3/2006 | Kataoka et al. | 123/179.4 |

FOREIGN PATENT DOCUMENTS

| | | |
|---|---|---|
| EP | 1 477 654 | 11/2004 |
| FR | 2 827 911 | 1/2003 |
| JP | A 2002-039038 | 2/2002 |
| JP | A 2002-070699 | 3/2002 |
| JP | A 2004-124908 | 4/2004 |
| JP | A 2004-162624 | 6/2004 |
| JP | A 2004-293327 | 10/2004 |
| JP | A 2005-282434 | 10/2005 |
| JP | A 2005-315202 | 11/2005 |

* cited by examiner

*Primary Examiner*—John T Kwon
(74) *Attorney, Agent, or Firm*—Oliff & Berridge, PLC

(57) ABSTRACT

In an automatic stop device that automatically stops the operation of an internal combustion engine after a predetermined automatic stop condition is satisfied, a load acting on the engine is removed when the automatic stop condition is satisfied. When the automatic stop condition is satisfied, the between the magnitude of the load on the internal combustion engine before and after of the automatic stop condition is satisfied is determined, and an ignition timing retard amount of an ignition plug is decided such that the retard amount is increased as the difference becomes greater. The ignition timing is retarded by the retard amount substantially at the same moment as the load removing operation before the automatic stop control is initiated.

22 Claims, 9 Drawing Sheets

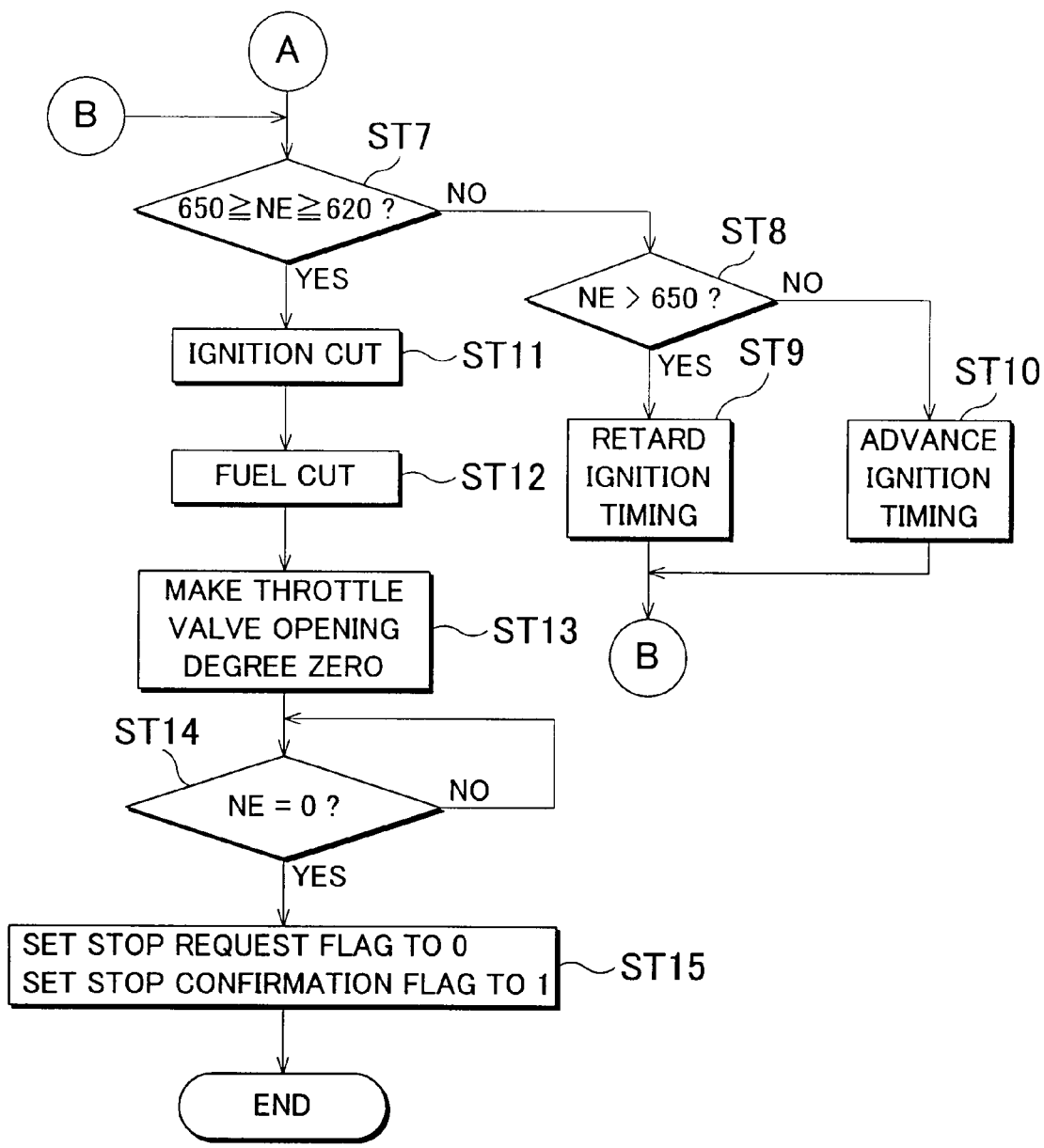

AUTOMATIC INTERNAL COMBUSTION ENGINE STOP DEVICE, INTERNAL COMBUSTION ENGINE PROVIDED WITH THE SAME AND AUTOMATIC INTERNAL COMBUSTION ENGINE STOP METHOD

INCORPORATION BY REFERENCE

The disclosure of Japanese Patent Application No. 2006-052672 filed on Feb. 28, 2006 including the specification, drawings and abstract is incorporated herein by reference in its entirety.

BACKGROUND OF THE INVENTION

1. Field of the Invention

The present invention relates to an automatic internal combustion engine stop device, an internal combustion engine provided with the same and an automatic internal combustion engine stop method; more particularly, to an improvement for optimizing a piston stop position in an automatic internal combustion engine stop device for automatically stopping an internal combustion engine (hereinafter simply referred to as "engine") during an idling operation thereof, for instance.

2. Description of the Related Art

When a motor vehicle stops at an intersection, for example, to wait for traffic lights to change in the course of running in an urban area, etc., the engine is left idling, which wastes fuel. In view of this, what is called an "idling stop control" has been conventionally performed to stop an engine by cutting off fuel supply to a combustion chamber (by conducting a so-called fuel cut) when specific conditions are satisfied, such when the vehicle is stopped (see, e.g., Japanese Patent Application Publication No. JP-A-2002-70699).

When the engine is stopped by the idling stop control (hereinafter, "idling stop state"), if an engine start condition is satisfied, e.g., the brake pedal is released or the shift lever is operated in the case of an auto transmission vehicle and the clutch pedal is depressed in the case of a manual transmission vehicle, the engine is restarted by driving a starter mechanism and transferring the drive power thereof to the engine, namely, by performing a so-called cranking operation.

When the engine is restarted from the idling stop state as described above, it is typical that initial combustion is caused by supplying fuel to a predetermined cylinder (hereinafter referred to as an "initial combustion target cylinder") and allowing an ignition plug to ignite the fuel, while performing the aforementioned cranking operation.

In the process of restarting the engine, restartability of the engine is greatly influenced by a condition such as which cylinder is selected as the initial combustion target cylinder or the position of a piston in the initial combustion target cylinder when the idling stop was executed (piston stop position).

For instance, if the piston stop position is not proper, a great deal of vibration is generated at the time of restart, thus giving an uncomfortable feeling to a driver and other vehicle occupants, or the time required for an engine to start up is prolonged to such a level as to give a sense of discomfort (what is called a feeling of delayed start) to the driver.

There will now be described a cause of generation of such vibration and a cause of prolongation of the time required for engine start. For the sake of easier understanding, the following description will be made by taking, as an example, a case where fuel is port-injected in a four-cylinder gasoline engine.

In the event that a piston stop position in an initial combustion target cylinder is near bottom dead center of the intake stroke (e.g., the piston is stopped at the 150 degree position in crank angle after top dead center of the intake stroke), the in-cylinder volume is increased and a large quantity of air is present in the cylinder. In the idling stop state, heat is transferred from the cylinder block and the like to the air in the cylinder, thereby keeping the air at an elevated temperature. This is because the engine was in an operating state just before its stoppage. Furthermore, because the intake valve of the cylinder is open during the intake stroke, an in-cylinder pressure is increased up to an atmospheric pressure nearly simultaneously with the engine stop. This also allows the quantity of air in the cylinder to grow larger than an air quantity available during the intake stroke in a typical engine operation process. That is to say, when the piston stop position in the initial combustion target cylinder lies near the bottom dead center of the intake stroke, a large quantity of air having a relatively high temperature exists in the cylinder. If the cylinder proceeds to a compression stroke after fuel supply is completed through the intake stroke, an air-fuel mixture may self-ignite, at which time a great deal of vibration is generated.

If the piston stop position in the initial combustion target cylinder lies near the bottom dead center of a stroke other than the intake stroke (any one of compression, expansion and exhaust strokes), the intake valve is closed and, under the idling stop control noted above, no fuel is supplied into the cylinder to thereby stop the engine. This means that no fuel is present in the cylinder. For this reason, the situation occurs where fuel is not supplied to the cylinder until the next intake stroke. Thus, initial combustion cannot be brought about unless the compression and expansion strokes begin subsequent to the next intake stroke. This prolongs the time required to start the engine.

On the other hand, if the piston stop position in the initial combustion target cylinder is not near bottom dead center, or if the cylinder is in other strokes than the intake stroke (any one of the compression, expansion and exhaust strokes), the situation occurs where fuel is not supplied into the cylinder until the next intake stroke, as in the aforementioned case. Thus, initial combustion cannot be brought about unless the compression and expansion strokes begin subsequent to the next intake stroke. This prolongs the time required to start the engine.

The above are the cause of generation of vibration and the cause of prolongation of the time required to start the engine. In order to avoid such situations, the piston stop position when the idling stop is performed should be appropriately set and the cylinder having the properly set piston stop position selected as the initial combustion target cylinder. For example, the piston stop position may be set near top dead center, and the cylinder being on the intake stroke at the time of idling stop may be chosen as the initial combustion target cylinder.

Such a manner of setting the piston stop position and choosing the initial combustion target cylinder applies to a port-injection engine. In case of an in-cylinder direct injection engine, the proper piston stop position and the initial combustion target cylinder may be set and chosen differently. In other words, inasmuch as the proper piston stop position may vary depending on engine specifications or the like, it is not always desirable that the piston of the cylinder being on the intake stroke at the time of idling stop be placed near the top dead center (the optimized piston stop position in the present invention is not limited thereto).

However, it is not easy to properly set the piston stop position at the time of idling stop. There is described in Japanese Patent Application Publication Nos. JP-A-2005-282434 and JP-A-2005-315202 a technique of adjusting a piston stop position by reversely rotating the crankshaft at the time of idling stop. Japanese Patent Application Publication No. JP-A-2002-39038 describes a device for restricting a piston stop position by use of a stopper.

With the technique disclosed in Japanese Patent Application Publication Nos. JP-A 2005-282434 and JP-A 2005-315202, however, the reverse rotation of the crankshaft may result in some adverse effects. For example, because the camshaft is reversely rotated and auxiliary mechanical components are reversely driven along with the reverse rotation of the crankshaft, it is concerned that the loads acting on individual components become heavier, thus shortening their life span. Further, in the device described in Japanese Patent Application Publication No. JP-A 2002-39038, there is a need to employ the stopper as an additional member for restricting the piston stop position. This increases the number of components and the requires an additional stopper attachment step in assembling the engine.

Thus, the present inventors have investigated an engine control operation by which a piston stop position can be set at a proper position (for example, a piston of a cylinder in an intake stroke can be stopped in the vicinity of a top dead center) when an engine is stopped by an idling stop control, without reversely rotating a crankshaft or using a stopper (e.g., an engine control operation by which. As a result, the following "piston stop position control" has been developed by the present inventors.

More specifically, when an engine load and an engine speed (rpm) are of given constant values, an engine generates a constant level of output energy. Under such conditions, if the ignition operation of an ignition plug is stopped (hereinafter referred to as "ignition cut") and if fuel injection is cur off (hereinafter referred to as "fuel cut"), a piston is always stopped at a given constant position.

Based on this principle, the present inventors have found that, if the load on the engine at the moment the idling stop control is performed are removed (e.g., by stopping the operation of an air conditioner and/or an alternator) and if the ignition cut and the fuel cut are carried out when the engine speed is a given constant value (a target idle speed in a load-free state, e.g., 650 rpm), the piston will consistently stop at the same position depending on the relationship between the inertial force of rotating movement of the crankshaft and reciprocating movement of the piston and a reaction force (a resistance force such as friction) counteracting the inertial force.

FIG. 9 is a view illustrating changes in the engine speed during the piston stop position control, wherein the X and Y axes represent time and the engine speed, respectively. Under the piston stop position control, an ignition cut and a fuel cut are performed at an idle speed in a load-free state (at an idle speed in a state of no idle-up control accompanying the lead operation, i.e., at an engine speed falling within the range "A" in FIG. 9).

Curve "I" in FIG. 9 represents changes in the engine speed when the ignition cut and the fuel cut have been performed, with an idling stop condition being satisfied in the load-free state. In this case, because the engine speed falls within the range "A" in advance of satisfaction of the idling stop condition, the ignition cut and the fuel cut are executed substantially at the same moment as the idling stop condition is satisfied. The engine stops when time "α" has lapsed after execution of the ignition cut and the fuel cut.

If the ignition cut and the fuel cut are executed in the load-free state as noted above, the engine is always stopped after lapse of time "α". This means that the piston stop position at the time of idling stop can be properly set at all times by executing the ignition cut and the fuel cut such that the piston stop position after lapse of time "α" becomes proper (e.g., the piston of the cylinder in an intake stroke stops near a top dead center).

In an actual operating state of the engine, however, it is often the case that the engine is operating under a relatively heavy load, e.g., the operation of an air conditioner. If, in this situation, the load is removed upon satisfaction of the idling stop condition, there is a possibility that the engine speed may be sharply increased (the engine may be accelerated) due to the removal of load.

Curve "II" in FIG. 9 represents a case where a sharp increase in the engine speed occurs due to the removal of load by satisfaction of the idling stop condition in a state of an idle-up control accompanying the load operation. In this case, after the engine speed is sharply increased, it is decreased by a feedback control of an idle speed to a target idle speed (an idle speed in a state of no idle-up control accompanying the load operation, i.e., an engine speed falling within the range "A" in FIG. 9). The ignition cut and the fuel cut are executed when the idle speed comes into the range "A". As is apparent from the curve "II", in the idling stop control executed after the engine speed is increased sharply, the decrease rate of engine speed per unit time becomes significantly greater. This leaves a possibility that the engine may be stopped within a short period of time (time "β" in FIG. 9) after execution of the ignition cut and the fuel cut. For this reason, the piston stop position at the time of idling stop is deviated from the piston stop position available in case of the curve "I", thus making it impossible to properly set the piston stop position. Furthermore, because the ignition cut and the fuel cut are not executed until the sharply increased engine speed drops within a predetermined range, i.e., the range "A", there is a possibility that the time (time "γ" in FIG. 9) required for the engine to stop after satisfaction of the idling stop condition may be prolonged.

Although the afore-mentioned automatic engine stop operation is directed to a case where an engine is automatically stopped by an idling stop control, the same issue may possibly be applied to a case that, in a so-called a "hybrid car" equipped with an engine and an electric motor for running and adapted to run with a drive power of one or both of the engine and the electric motor, the engine is automatically stopped during the running (the running is carried out only with the driving power of the electric motor or a regenerative operation is started). That is, in case the above-noted "piston stop position control" is employed in an automatic engine stop control during a running of the hybrid car, loads such as electric power generation and the like need to be removed at the same moment as satisfaction of an engine stop condition in order to optimize the piston stop position. The removal of load is accompanied by a sharp increase in an engine speed (acceleration of the engine). Similarly to the above-described case, this may possibly result in deviation of the piston stop position or prolongation of the time required for the engine to stop.

SUMMARY OF THE INVENTION

The present invention provides an automatic stop device that automatically stops an internal combustion engine wherein, when the internal combustion engine is automatically stopped, a piston is stopped at a proper position regardless of an operating state before an internal combustion engine stop condition is satisfied and without excessively prolonging the time required for the internal combustion engine to stop, an internal combustion engine provided with the automatic engine stop device, and an automatic stop method for an internal combustion engine.

In the process of properly setting a piston stop position by stopping an internal combustion engine after removing or reducing the load on the engine (e.g., electrical loads), it is possible to suppress acceleration of the internal combustion engine, and to thereby stop a piston at an appropriate position within a shortened period of time by retarding the ignition timing of an ignition plug when the loads are removed.

In accordance with a first aspect of the present invention, there is provided an automatic stop device that performs an automatic internal combustion engine stop control to stop the operation of the internal combustion engine when a predetermined automatic stop condition has been satisfied. The automatic stop device includes a load control unit, a load recognition unit and an ignition timing control unit. The load control unit removes the load acting on the internal combustion engine or reduces the load to a predetermined level when the automatic stop condition is satisfied. The load recognition unit serves to recognize the magnitude of the load acting on the internal combustion engine before the load is removed or reduced by the load control unit. Once the automatic stop condition has been satisfied, the ignition timing control unit determines the difference between the magnitude of the load on the internal combustion engine before and after the automatic stop condition is satisfied in accordance with the magnitude of the load on the internal combustion engine, to decide the appropriate retard amount of ignition timing of an ignition plug. The retard amount is increased as the difference becomes greater. The ignition timing control unit also retards the ignition timing of the ignition plug by the retard amount substantially at the same time as the load removing operation or the load reducing operation by the load control unit before the automatic stop control is initiated.

In accordance with a second aspect of the present invention, the automatic stop device stops the ignition operation of an ignition plug and cuts off the fuel supply when a predetermined automatic stop condition has been satisfied. The automatic stop device includes a load control unit, a load recognition unit, an ignition timing control unit and an automatic stop unit. The load control unit serves to remove a load acting on the internal combustion engine when the automatic stop condition is satisfied. The load recognition unit serves to recognize the magnitude of the load acting on the internal combustion engine before the load control unit removes the load. When the automatic stop condition has been satisfied, the ignition timing control unit determines the ignition timing retard amount of the ignition plug such that the retard amount is increased as the magnitude of the load on the internal combustion engine before the satisfaction of the automatic stop condition becomes greater, and retard the ignition timing of the ignition plug by the retard amount substantially at the same moment as the load removing operation by the load control unit. The automatic stop unit stops the internal combustion engine by stopping the ignition operation of the ignition plug and by cutting off the fuel supply at a moment when a speed of the internal combustion engine reaches a predetermined automatic stop operation triggering speed through the retarding operation of the ignition timing of the ignition plug by the ignition timing control unit.

As described above, if the ignition operation of the ignition plug is stopped and if the fuel injection is cut off when the load on the internal combustion engine and the engine speed are constant, a piston is always stopped at a constant position. This makes it possible to stop the piston at that proper position where startability of the internal combustion engine is enhanced. In this case, mere removal or reduction of the loads acting against the engine may bring about a rapid increase in the speed of the internal combustion engine. This may result in deviation of the piston stop position or prolongation of the time required for the internal combustion engine to stop. Thus, in the above aspects, the output power of the internal combustion engine is decreased by retarding the ignition timing of the ignition plug substantially at the same time as removal or reduction of the loads acting against the internal combustion engine. The ignition timing retard amount is proportional to the amount by which the load on the internal combustion engine is reduced. In other words, if the load on the internal combustion engine is greatly reduced, the more rapidly the speed of the internal combustion engine tends to increase in proportion thereto. In this case, the ignition timing retard amount is also set large. By setting the retard amount in this manner, it is possible to proportionally reduce the power of the internal combustion engine with respect to the reduction amount in the load, whereby the change in the speed of the internal combustion engine can be suppressed even when the load is removed or reduced. Namely, the automatic stop operation can be executed when the speed of the internal combustion engine is stabilized, thereby making it possible to stop the internal combustion engine at a proper piston stop position within a shortened period of time.

The following are more specific examples of the configuration for stopping the internal combustion engine by stopping the ignition operation of the ignition plug and by cutting off the fuel supply at the moment the speed of the internal combustion engine reaches the predetermined automatic stop operation triggering speed. The automatic stop unit first stops the ignition operation of the ignition plug and then cuts off the fuel supply, at the moment the speed of the internal combustion engine reaches the predetermined automatic stop operation triggering speed through the retarding operation of the ignition timing of the ignition plug by the ignition timing control unit.

As noted above, if the ignition operation of the ignition plug is stopped before the fuel supply is cut off in the internal combustion engine automatic stop operation, there exists no cylinder in which a residual air-fuel mixture is combusted (an expansion stroke is executed) after the internal combustion engine automatic stop operation is initiated. This makes it possible to properly set the piston stop position with an increased accuracy in the process of stopping the internal combustion engine, which improves a reliable startability of the internal combustion engine when restarting the engine.

Further, the internal combustion engine may be a multi-cylinder internal combustion engine in which case the automatic stop unit serves to stop the ignition operation of the ignition plug and cut off the fuel supply such that a stop position of a piston in a cylinder in an intake stroke is located near a top dead center when the internal combustion engine is stopped.

The configuration is particularly effective for a port-injected internal combustion engine whose fuel injection valve is provided in an intake port. As described above, in case the piston stop position of an initial combustion target cylinder is located near a bottom dead center, a large quantity of air is present in the cylinder at a relatively high temperature, thus leaving a possibility that an air-fuel mixture may auto-ignite to cause a great deal of vibration. Furthermore, the time required for the internal combustion engine to start is prolonged because no fuel is supplied into the cylinder until the next intake stroke. Moreover, in a case where the piston stop position in the initial combustion target cylinder lies outside the vicinity of the bottom dead center, if the cylinder is in a stroke other than the intake stroke (any one of the compression, expansion and exhaust strokes), no fuel is supplied into the cylinder until the next intake stroke, as in the preceding case. This prolongs the time required for the internal combustion engine to start. Taking this into account, if the internal combustion engine is stopped such that the piston stop position of a cylinder in the intake stroke lies near the top dead center and if that cylinder is selected as the initial combustion target cylinder, it becomes possible to supply fuel into the cylinder substantially at the same moment as commencement of the restart operation, whereby initial combustion can be completed in the compression stroke and the expansion stroke just after the fuel supply. This makes it possible to start the internal combustion engine within an extremely short period of time, while avoiding generation of vibration which would otherwise occur by the self-ignition of the air-fuel mixture.

In the event that the ignition operation of the ignition plug is stopped and the fuel supply is cut off by the automatic stop unit at a moment when the speed of the internal combustion engine detected at predetermined intervals reaches the predetermined automatic stop operation triggering speed, the ignition timing control unit advances the ignition timing of the ignition plug to increase the speed of the internal combustion engine if the speed of the internal combustion engine detected at the predetermined intervals is decreased below the automatic stop operation triggering speed without being the automatic stop operation triggering speed. Then, the automatic stop unit stops the internal combustion engine by stopping the ignition operation of the ignition plug and by cutting off the fuel supply, at a moment when the speed of the internal combustion engine reaches the automatic stop operation triggering speed.

In consideration of, e.g., the variation in the rotation speed of the internal combustion engine, this configuration is applied to a case of detecting the speed of the internal combustion engine available at the timing when the speed becomes greatest in the expansion strokes of the respective cylinders, determining whether the speed has reached the automatic stop operation triggering speed, and stopping the ignition operation of the ignition plug and cutting off the fuel supply when the speed has reached the automatic stop operation triggering speed. In this case, if the rotation speed of the internal combustion engine is changed rapidly, there is a possibility that the speed of the internal combustion engine detected at the predetermined intervals is decreased below the automatic stop operation triggering speed without being the automatic stop operation triggering speed, which makes it impossible to perform the automatic stop operation of the internal combustion engine by stopping the ignition operation of the ignition plug and by cutting off the fuel supply. Thus, in the above aspects, if such a situation occurs, the ignition timing of the ignition plug is advanced to increase the speed of the internal combustion engine, and the ignition operation of the ignition plug is stopped and the fuel supply is cut off at a moment when the speed of the internal combustion engine has reached the automatic stop operation triggering speed. This ensures that the automatic stop of the internal combustion engine is executed in a reliable manner.

In a more specific example of the automatic stop device, there is provided a throttle control unit for reducing an intake air quantity by decreasing an opening degree of a throttle valve at the same time as the retarding operation of the ignition timing of the ignition plug is started by the ignition timing control unit. As such, if the intake air quantity is reduced together with the retard operation of the ignition timing, it becomes possible to promptly decrease the speed of the internal combustion engine to the automatic stop operation triggering speed, thereby shortening the time required for the automatic internal combustion engine stop control (the control of stopping the ignition operation of the ignition plug and cutting off the fuel supply) to start after the satisfaction of the automatic stop condition for the internal combustion engine. This makes it possible to stop the internal combustion engine at a proper piston stop position within a shorter period of time.

The automatic stop device in accordance with the above aspects may be applied in automatically stopping the internal combustion engine installed in a motor vehicle that performs an idling stop control operation. That is to say, the automatic stop device is applied to a motor vehicle that performs the idling stop control operation to automatically stop the internal combustion engine when an idling stop condition is satisfied during stoppage of the motor vehicle.

An internal combustion engine for a motor vehicle including the automatic stop device of the above aspects, which performs a start operation upon satisfaction of an internal combustion engine restart condition, also falls within the scope of the present invention. Namely, the motor vehicle internal combustion engine is configured to select a cylinder in an intake stroke in a stop state as an initial combustion target cylinder by supplying fuel to the cylinder when the internal combustion engine restart condition is satisfied in the automatic stop state of the internal combustion engine, and by starting the ignition operation of the ignition plug when the cylinder performs an expansion stroke.

In accordance with a third aspect of the present invention, there is provided an automatic stop method for an internal combustion engine that executes an automatic internal combustion engine stop control to stop the operation of an internal combustion engine after a predetermined automatic stop condition is satisfied. The automatic stop method comprises: removing a load on the internal combustion engine or reducing the load to a predetermined level when the automatic stop condition is satisfied; recognizing a magnitude of the load acting on the internal combustion engine before the load is removed or reduced; calculating a difference between the magnitude of the load on the internal combustion engine before and after the automatic stop condition is satisfied in accordance with the magnitude of the load on the internal combustion engine; selecting an ignition timing retard amount of an ignition plug such that the retard amount is increased the greater the difference between the magnitude of the load before and after the automatic stop condition is satisfied; and retarding the ignition timing of the ignition plug by the retard amount at substantially the same moment as the load removing operation or the load reducing operation is executed, before the automatic stop control is initiated.

In accordance with a fourth aspect of the present invention, there is provided an automatic stop method for automatically stopping an internal combustion engine by stopping an ignition operation of an ignition plug and by cutting off a fuel supply after satisfaction of a predetermined automatic stop condition for the internal combustion engine. The automatic stop method comprises: removing a load on the internal combustion engine when the automatic stop condition is satisfied; recognizing a magnitude of the load acting on the internal combustion engine before the load is removed; selecting an ignition timing retard amount of the ignition plug such that the retard amount is increased the greater the magnitude of the load before the automatic stop condition is satisfied; retarding the ignition timing of the ignition plug by the retard amount at substantially the same moment the load removing operation is executed; and stopping the internal combustion engine by stopping the ignition operation of the ignition plug and by cutting off the fuel supply when a speed of the internal combustion engine reaches a predetermined automatic stop operation triggering speed through the retarding of the ignition timing of the ignition plug.

In the present invention, acceleration of the internal combustion engine is suppressed by retarding the ignition timing of the ignition plug upon removal of the loads and properly setting the retard amount of the ignition timing, as opposed to a case where the piston stop position is properly set by removing the loads (an electrical load and the like) acting against the internal combustion engine and then performing the internal combustion engine stop operation upon satisfaction of the internal combustion engine automatic stop condition. This allows the internal combustion engine automatic stop operation to be performed under a state that the speed of the internal combustion engine is stabilized, thereby making it possible to stop the internal combustion engine at a proper piston stop position within a shortened period of time. Thus, the task of restarting the internal combustion engine can be completed without generating a great deal of vibration and within a short period of time.

BRIEF DESCRIPTION OF THE DRAWINGS

The above and other objects and features of the present invention will become apparent from the following description of preferred embodiments given in conjunction with the accompanying drawings, in which:

FIGS. 6 and 7 show a flowchart of sequences of the idling stop control;

DETAILED DESCRIPTION OF THE PREFERRED EMBODIMENTS

Hereinafter, preferred embodiments of the present invention will be described with reference to the accompanying drawings. In the present embodiments, description will be given to an instance that the present invention is applied to a multi-cylinder (e.g., four-cylinder) gasoline engine installed in a vehicle.

Figure 1:
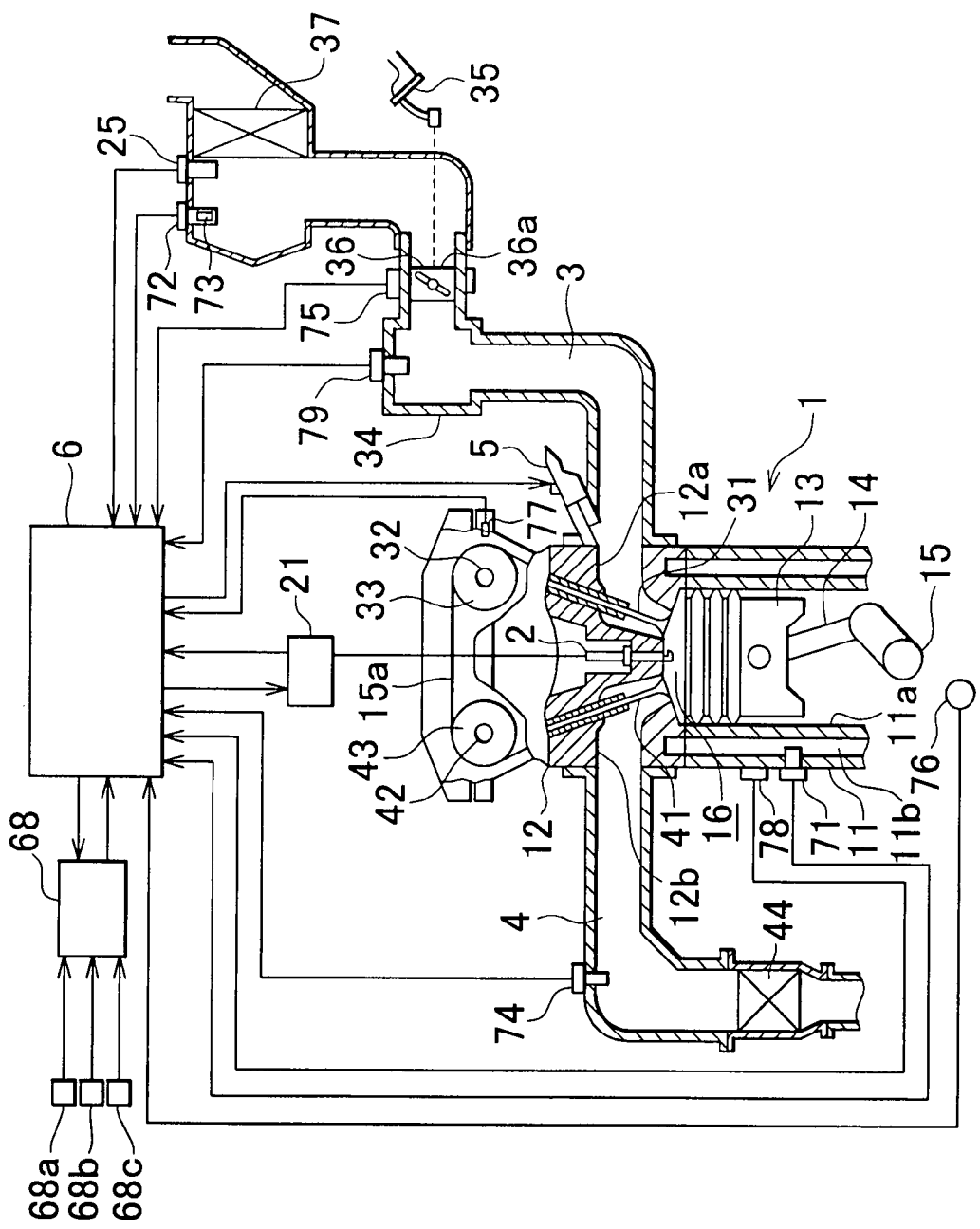
FIG. 1 is a system diagram showing a schematic configuration of an internal combustion engine in accordance with a preferred embodiment of the present invention.

First, a schematic configuration of an engine (internal combustion engine) in accordance with an example embodiment of the present invention will be described with reference to FIG. 1. As shown in FIG. 1, the engine 1 of the present embodiment includes a cylinder block 11 and a cylinder head 12, the cylinder block 11 having cylinder bores 11a corresponding to four cylinders (only one cylinder bore is shown in FIG. 1). A piston 13 is slidably provided in each of the cylinder bores 11a and is connected through a connecting rod 14 to a crankshaft 15 serving as an output shaft of the engine 1. Further, there is defined in each of the cylinder bore 11a a combustion chamber 16 surrounded by the piston 13 and the cylinder head 12.

An ignition plug 2 is provided in each cylinder head 12 corresponding to each of the combustion chambers 16. Each cylinder head 12 is provided with an intake port 12a and an exhaust port 12b communicating with the corresponding combustion chambers 16. An intake passage 3 and an exhaust passage 4 are respectively connected to the intake port 12a and the exhaust port 12b. An intake valve 31 and an exhaust valve 41 are respectively provided at open ends of the intake port 12a and the exhaust port 12b communicating with the combustion chamber 16. The intake valve 31 and the exhaust valve 41 are opened and closed by means of an intake camshaft 32 and an exhaust camshaft 42, respectively, which are individually rotated by a movement of the crankshaft 15. The movement of the crankshaft 15 is transferred to the intake camshaft 32 and the exhaust camshaft 42 via a timing belt 15a and respective timing pulleys 33 and 43.

In the vicinity of the intake port 12a, there is provided a fuel injection valve (injector) 5 for each of the corresponding cylinders. Fuel is supplied at a predetermined pressure through a fuel supply system to the respective injectors 5.

Furthermore, a surge tank 34 is provided in the intake passage 3 and a throttle valve 36 is provided upstream of the surge thank 34. The throttle valve 36 is opened and closed by means of a throttle motor 36a, which is driven by depression of an acceleration pedal 35. The quantity of an intake air introduced into the intake passage 3 is controlled depending on an opening degree of the throttle valve 36. At the downstream side of the throttle valve 36, there is provided an air cleaner 37 for purifying the intake air.

If the engine 1 begins to operate, the intake air is introduced into the intake passage 3 and the fuel is injected from the injector 5, so that the intake air and the fuel are mixed into an air-fuel mixture. In an intake stroke of the engine 1, when the intake valve 31 opens, the air-fuel mixture enters the corresponding combustion chamber 16 through the intake port 12a. The air-fuel mixture introduced into the combustion chamber 16 is compressed in a compression stroke and then ignited by the ignition plug 2. The air-fuel mixture is exploded and combusted to impart a drive force to the crankshaft 15 (expansion stroke). The exhaust port 12b is opened by the exhaust valve 41, thus allowing the exhaust gas to be discharged through the exhaust passage 4 (exhaust stroke). The exhaust gas is purified by a catalyst 44 and then emitted to the outside. The ignition plug 2 ignites the air-fuel mixture pursuant to the application timing of a high voltage output from an igniter 21.

Figure 2:
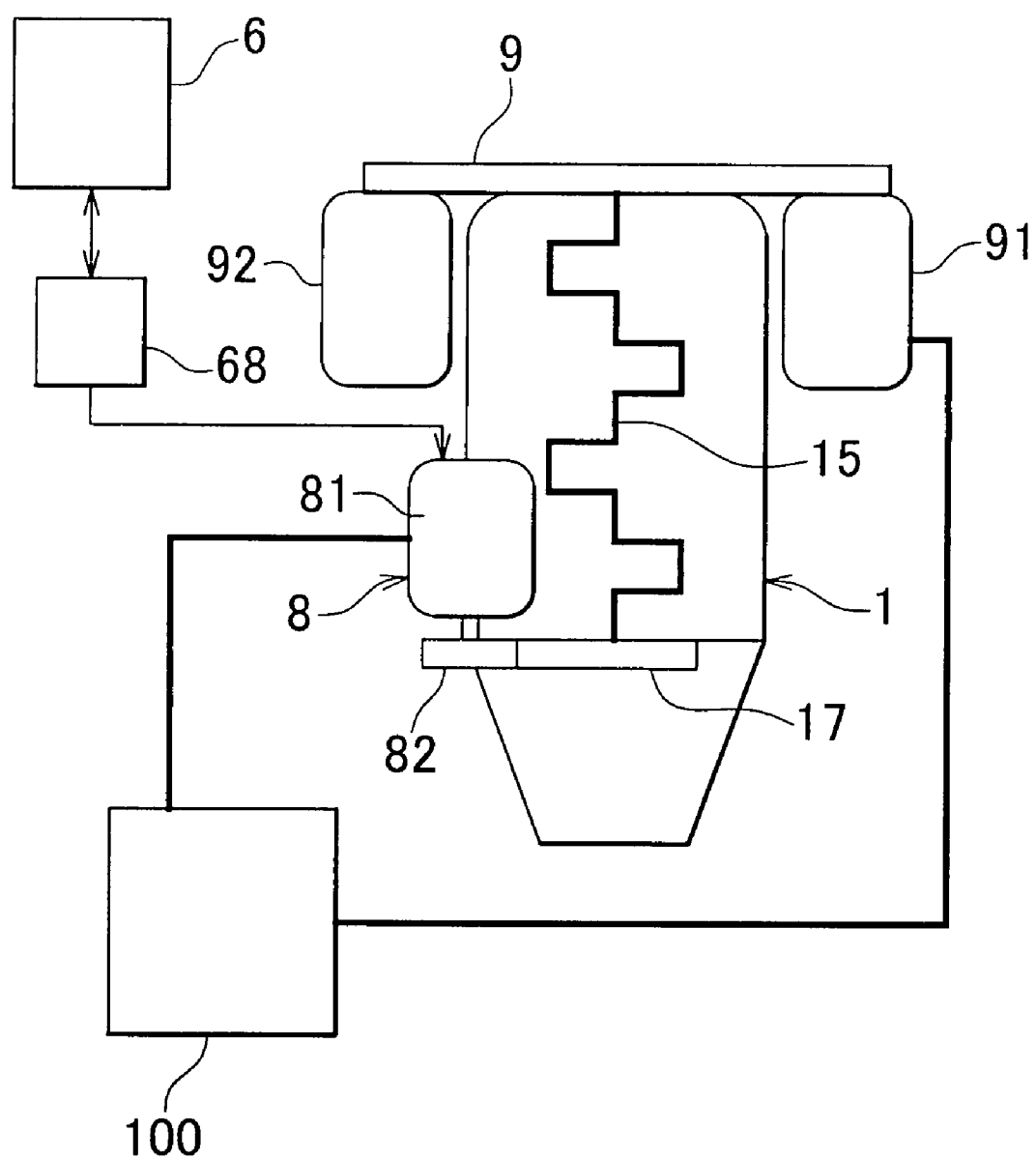
FIG. 2 is a top view schematically illustrating the configuration of the engine in accordance with the embodiment of the present invention.

Referring to FIG. 2 (a top view of the engine illustrating a schematic configuration thereof), a ring gear 17 is attached to one end of the crankshaft 15 and a starter 8 operated at the time of starting the engine 1 is associated with the ring gear 17. The starter 8 includes a starter motor 81 and a pinion gear 82 fixedly secured to a drive shaft of the starter motor 81. The starter motor 81 is rotated when the pinion gear 82 is engaged with the ring gear 17, the drive force of the starter motor 81 is transferred to the crankshaft 15 through the ring gear 17, thereby cranking the engine 1.

A crankshaft pulley (not shown) is attached to the other end of the crankshaft 15. An alternator 91 and a compressor 92 of an air conditioner are operatively associated with the crankshaft pulley through a power transmission belt 9. Accordingly, with the operation of the engine 1, the alternator 91 generates electric power and/or the air conditioner can condition the air in the passenger compartment.

The alternator 91 generates electric power by the rotational force of the crankshaft 15. Specifically, the generation of electric power by the alternator 91 is controlled by the alternator drive circuit. An engine ECU (Electronic Control Unit) 6, which will be described later, sends a power generation command signal (an output request signal) to the alternator drive circuit. The alternator drive circuit includes a regulator and a controller.

The alternator 91 is provided with a diode rectifier, a stator and a rotor coil rotated by the rotational force of the crankshaft 15. If an excitation current is applied to the rotor coil, the rotor coil rotates while generating magnetic flux, whereby a three-phase alternating current is induced in the stator. The three-phase alternating current in the stator is converted to a direct current by means of the diode rectifier and then output to the alternator 91. The direct current voltage output from the alternator 91 charges the battery 100.

The regulator of the alternator drive circuit includes a switching transistor for changing over electric conduction and isolation between the battery 100 and the rotor coil and a transistor drive circuit for turning the switching transistor on and off.

The controller of the alternator drive circuit is connected to the transistor drive circuit via an electric wiring line and controls the switching transistor by transmitting the appropriate drive signal to the transistor drive circuit to turn the switching transistor on or off. At this time, the controller senses the voltage output from the alternator 91 and controls the regulator to regulate the excitation current of the rotor coil such that the output voltage becomes a desired value. This makes it possible to variably control a power generation voltage.

The engine ECU 6 outputs to the alternator drive circuit one of a "high power generation" command, a "low power generation" command and a "power generation cut" command. The "high power generation" command maintains the power generation voltage at, e.g., 14.8 V in order to maximize the electric power generated by the alternator 91. The "low power generation" command is a command by which the balance of electric currents input to and output from the battery 100 within a given period of time becomes ±0 A, for example. That is, the "low power generation" command is the one that allows the alternator 91 to generate the minimum level of electric power that is needed. The "power generation cut" command prohibits the generation of electric power by the alternator 91. Specifically, the alternator 91 is substantially inhibited from generating the electric power by keeping the power generation voltage (desired output value) at a value (e.g., 10 V) lower than a charging voltage value in the battery 100 (typically, 12 V). In this case, the power generation load acting against the engine 1 also becomes zero.

In the meantime, the compressor 92 of the air conditioner is operatively connected through a clutch mechanism to an air conditioner pulley around which the power transmission belt 9 is wound. If the clutch mechanism is engaged during operation of the engine 1, the drive force of the crankshaft 15 is transferred to the compressor 92 to drive the compressor 92, so that refrigerant is circulated through a refrigerant circuit of the air conditioner to thereby condition the air in the passenger compartment. This means that, even when the engine 1 is in operation, the compressor 92 if the clutch mechanism is not engaged. Thus, the load on the engine 1 by the air conditioner becomes zero.

Figure 3:
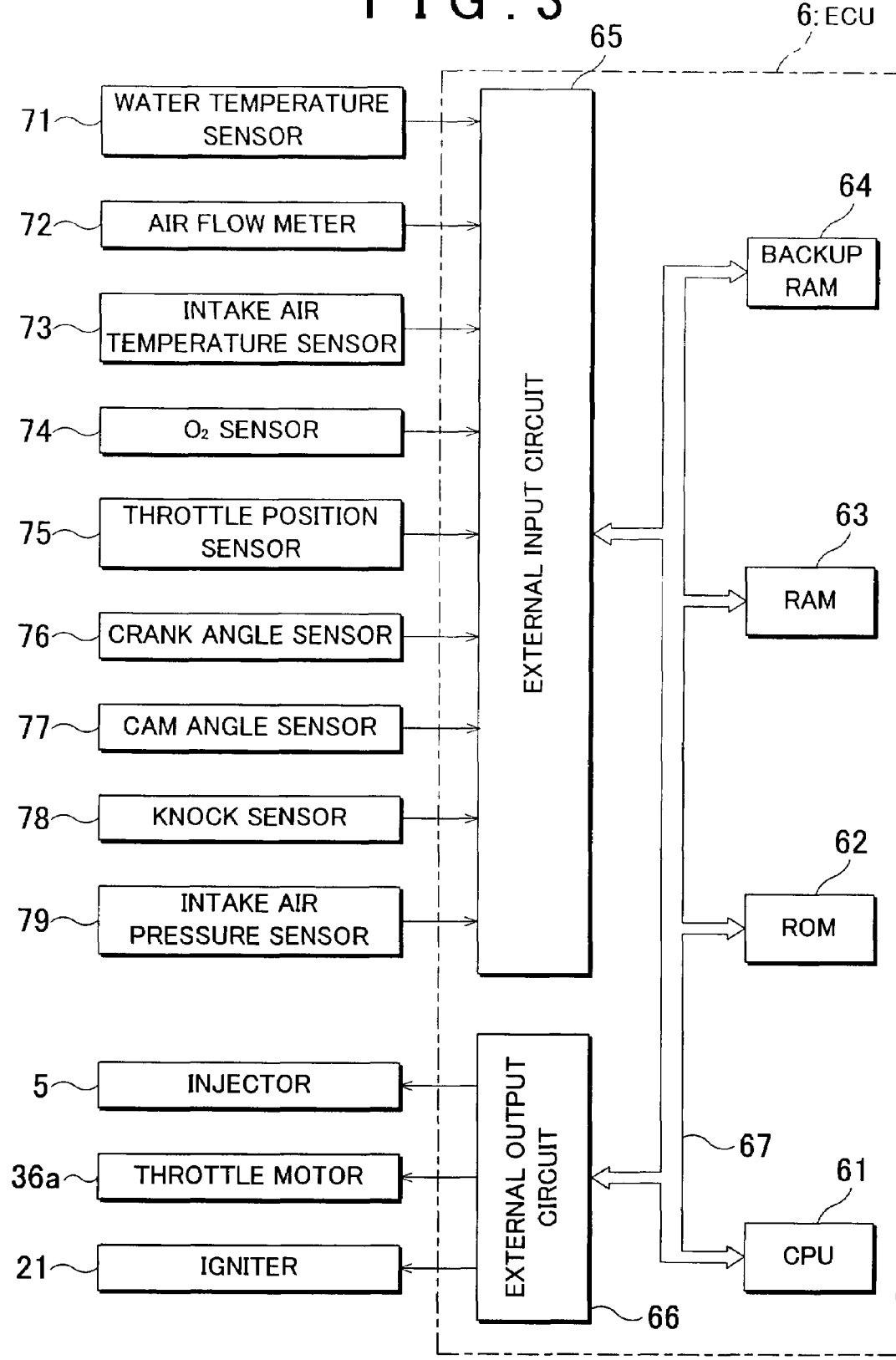
FIG. 3 is a schematic control block diagram of the engine.

The engine ECU 6 controls the operating condition of the engine 1. As illustrated in FIG. 3, the engine ECU 6 includes a CPU (Central Processing Unit) 61, a ROM (Read Only Memory) 62, a RAM (Random Access Memory) 63, a backup RAM 64 and so forth.

In the ROM 62, there are stored a variety of control programs, a map which is referred to when executing the variety of control programs, and the like. The CPU 61 performs an operation process based on the variety of control programs and the map stored in the ROM 62.

The RAM 63 temporarily stores the results of the operation process of the CPU 61 and data that is input from individual sensors. The backup RAM 64 is a nonvolatile memory for storing data that needs to be preserved while the engine 1 is stopped. The ROM 62, the CPU 61, the RAM 63 and the backup RAM 64 are connected to one another and also connected to an external input circuit 65 and an external output circuit 66 via a bus 67.

Connected to the external input circuit 65 are a water temperature sensor 71, an air flow meter 72, an intake air temperature sensor 73, an $O_2$ sensor 74, a throttle position sensor 75, a crank angle sensor 76, a cam angle sensor 77, a knock sensor 78 and an intake air pressure sensor 79. In addition, the injector 5, the igniter 21 and the throttle motor 36a for driving the throttle valve 36, and the like may also be connected to the external output circuit 66.

The water temperature sensor 71 detects the temperature of the coolant flowing through a water jacket 11b formed in the cylinder block 11 and transmits a signal indicating the cooling water temperature to the engine ECU 6.

The air flow meter 72 detects the quantity of an intake air introduced and transmits a signal indicating the intake air quantity to the engine ECU 6.

The intake air temperature sensor 73 is provided as a unit with the air flow meter 72 and detects the intake air temperature and transmits a signal indicating the intake air temperature to the engine ECU 6.

The $O_2$ sensor 74 detects the oxygen concentration in the exhaust gas and determines whether the air-fuel ratio of the exhaust gas corresponds to a stoichiometric ratio and transmits a signal indicating the determination result to the engine ECU 6.

The throttle position sensor 75 detects the opening degree of the throttle valve 36 and transmits a signal indicative of the throttle opening degree to the engine ECU 6.

The crank angle sensor 76 is provided near the crankshaft 15 and detects the rotation angle (crank angle CA) and the rotational speed (engine speed NE) of the crankshaft 15. Specifically, the crank angle sensor 76 generates a pulse signal every predetermined crank angle (e.g., 30 degrees). One example method of detecting the crank angle by using the crank angle sensor 76 is as follows. External teeth are formed at intervals of 30 degrees on an outer circumferential surface of a rotor (NE rotor) rotating together with the crankshaft 15. The crank angle sensor 76, which is formed of an electromagnetic pickup, is arranged in a confronting relationship with the external teeth. Each time the external teeth pass near the crank angle sensor 76 with rotation of the crankshaft 15, the crank angle sensor 76 generates an output pulse. Further, a rotor having external teeth formed on its outer circumferential surface at intervals of 10 degrees may be employed as the NE rotor. In this case, frequency dividing is performed in the engine ECU 6 to generate an output pulse every 30 degree crank angle.

The cam angle sensor 77 is arranged near the intake camshaft 32 and generates a pulse signal in correspondence to, e.g., a compression top dead center (TDC) of a first cylinder #1, so that the cam angle sensor 77 is used as a cylinder discrimination sensor. That is, the cam angle sensor 77 generates a pulse signal every rotation of the intake camshaft 32. One example method of detecting the cam angle with the cam angle sensor 77 is as follows. An external tooth is formed at a single location on an outer circumferential surface of a rotor rotating together with the intake camshaft 32. The cam angle sensor 77, which is formed of an electromagnetic pickup, is arranged in a confronting relationship with the external tooth. Each time the external tooth passes near the cam angle sensor 77 with rotation of the intake camshaft 32, the cam angle sensor 77 generates an output pulse. The rotor rotates at a rotational speed one half of that of the crankshaft 15 and therefore generates an output pulse every 720 degrees of rotation by the crankshaft 15. In other words, the output pulse is generated each time one specific cylinder performs the same stroke thereof (for example, every time the piston of the first cylinder #1 reaches its compression top dead center).

The knock sensor 78 may be a piezoelectric or electromagnetic (magnet and coil) vibration sensor that detects engine vibration transferred to the cylinder block 11.

The intake air pressure sensor 79 is provided in the surge tank 34 and detects the pressure within the intake passage 3 (the pressure within the intake line) and transmits a signal indicating the intake air pressure to the engine ECU 6.

Based on the output signals of the respective sensors 71 to 79, the engine ECU 6 controls individual components of the engine such as the igniter 21, the injector 5, the throttle motor 36a and the like, thereby performing various controls of the engine 1 including the ignition timing control (retard control) set forth below.

For example, the ignition timing of the ignition plug 2 by the igniter 21 is basically controlled in the following manner. If the knock sensor 78 senses knocking while advance correction of the ignition timing is performed to make the ignition timing approach the MBT (Minimum Spark Advance for Best Torque: optimal ignition timing), retard correction of the ignition timing is executed to alleviate the knocking. The fuel injection quantity of the injector 5 is controlled as follows. A target air-fuel ratio is calculated based on the engine load and the engine speed, and the fuel injection quantity (the opening time period of the injector 5) is controlled based on the intake air quantity detected by the air flow meter 72 to obtain the target air-fuel ratio. Furthermore, operation of the throttle motor 36a is controlled based on the depression degree of the acceleration pedal 35 and the like to accomplish an opening degree of the throttle valve 36 at which the intake air quantity becomes suitable for producing the desired engine output power. A detailed description of the ignition timing control of the ignition plug 2 and the opening degree control of the throttle valve 36 will be provided in the below-mentioned idling stop control (automatic internal combustion engine stop control).

A motor vehicle in accordance with the present embodiment is designed to perform a so-called idling stop control through which the engine 1 is halted by stopping the ignition operation of the ignition plug 2 (ignition cut) and cutting off the fuel supply from the injector 5 (fuel cut) when the motor vehicle is temporarily stopped at an intersection, for example, to wait for traffic lights to change. Hereinafter, there will be described a system configuration for performing the idling stop control.

As shown in FIGS. 1 and 2, an idle stop controller 68 for performing the idling stop control is connected to the engine ECU 6. The idle stop controller 68 transmits an ignition cut signal and a fuel cut signal to the engine ECU 6 when an idling stop condition (automatic stop condition of the internal combustion engine) is satisfied. On the other hand, when an engine start condition (idling stop release condition) is met, the idle stop controller 68 transmits an ignition cut termination signal and a fuel cut termination signal to the engine ECU 6 and also transmits a start control signal to the starter 8.

Furthermore, the idle stop controller 68 receives a vehicle speed sensing signal from a vehicle speed sensor 68a, a shift position signal from a shift lever position sensor 68b, and a brake pedal depression signal and a brake pedal release signal from a brake pedal sensor 68c. In addition, the idle stop controller 68 receives the engine speed signal NE detected by the crank angle sensor 76 from the engine ECU 6.

The idling stop condition of the motor vehicle in accordance with the present embodiment is satisfied, e.g., if a zero vehicle speed is detected by the vehicle speed sensing signal from the vehicle speed sensor 68a and if depression of the brake pedal is detected by the brake pedal depression signal from the brake pedal sensor 68c under the condition that the ignition is turned on. When the idling stop condition is satisfied, the idle stop controller 68 transmits the ignition cut signal and the fuel cut signal to the engine ECU 6. In response to the ignition cut signal and the fuel cut signal, the engine ECU 6 performs an ignition timing control and a throttle valve opening degree control for the piston stop position control operation set forth later. Subsequently, the engine ECU 6 begins to perform an engine stop operation by executing a control for stopping an ignition operation of the ignition plug 2 and then conducting a control for cutting off a fuel injection operation of the injector 5.

The engine start condition for starting the engine 1 after the engine 1 is stopped by the idling stop control is satisfied, either if execution of a brake pedal release is detected by the brake pedal release signal from the brake pedal sensor 68c or if movement of a shift lever from one of an "N (neutral)" position and a "P (parking)" position to one of drive range positions such as a "D (drive)" position, a "1 (first speed)" position, a "2 (second speed)" position and an "R (reverse)" position is detected by the shift position signal from the shift lever position sensor 68b, after the idling stop condition has been satisfied. After the engine start condition is satisfied, the idle stop controller 68 transmits the ignition cut termination signal and the fuel cut termination signal to the engine ECU 6 and also transmits the start control signal to the starter 8. In response to the ignition cut termination signal and the fuel cut termination signal, the engine ECU 6 performs a control for initiating the ignition operation of the ignition plug 2 and the fuel injection operation of the injector 5. Furthermore, in response to the start control signal, the starter motor 81 of the starter 8 is actuated to thereby perform a cranking operation of the engine 1.

The features of the present invention relate to the piston stop position control operation, which is performed to set the piston stop position at the appropriate position when the engine 1 is stopped by the idling stop control. The term "appropriate position" used in defining the piston stop position refers to the position that assures good startability when restarting the engine 1 after the satisfaction of the engine start condition. While the proper position may vary depending on the engine specifications and the like, the following description will be given by taking as an example a case where the piston 13 of a cylinder in an intake stroke is stopped near a top dead center in the present embodiment.

First, there will now be described the principles of the piston stop position control operation. When the loads on the engine 1 and the engine speed are constant, the engine 1 outputs a constant level of energy. If an ignition cut and a fuel cut are conducted under this state, the piston 13 is always stopped at a constant position. For this reason, if the loads on the engine at the moment of starting the idling stop control are removed (e.g., by stopping the operations of the air conditioner and the alternator 91) and if the ignition cut and the fuel cut are carried out when the engine speed has a constant value (a target idle speed in a load-free state, e.g., 650 rpm), the piston 13 can be stopped at a constant position dependent upon the relationship between inertia forces of rotating movement of the crankshaft 15 and reciprocating movement of the piston 13 and reaction forces (resistance forces such as friction) counteracting the inertia forces.

In the present embodiment, in order to set the piston stop position at a proper position, the loads on the engine 1 are removed when the idling stop control is initiated. Specifically, the load of the air conditioner on the engine 1 is made zero by forcibly disengaging the clutch mechanism of the compressor 92 of the air conditioner. Furthermore, the alternator 91 is substantially inhibited from generating an electric power to make the power generation load acting against the engine 1 zero, when the engine ECU 6 sends an "power generation cut" command to the alternator drive circuit. In this state, the ignition cut and the fuel cut are conducted to thereby set the piston stop position at a proper position. However, the removal of the loads acting against the engine 1 may bring about a rapid increase in the engine speed (acceleration of the engine 1), which results in deviation of the piston stop position and/or prolongation of the time required for the engine 1 to stop as set forth above.

In the present embodiment, when the idling stop control starts after the idling stop condition is satisfied, the ignition timing of the ignition plug 2 is retarded simultaneously with removal of the loads on the engine 1.

In order to determine the appropriate ignition timing retard amount, an ignition timing retard amount decision map is pre-stored in the idle stop controller 68. The ignition timing retard amount decision map is used to determine the ignition timing retard amount of the ignition plug 2 in accordance with the loads on the engine 1 (the load of the air conditioner and the power generation load acting against the engine 1) before the idling stop control is satisfied.

Figure 4:
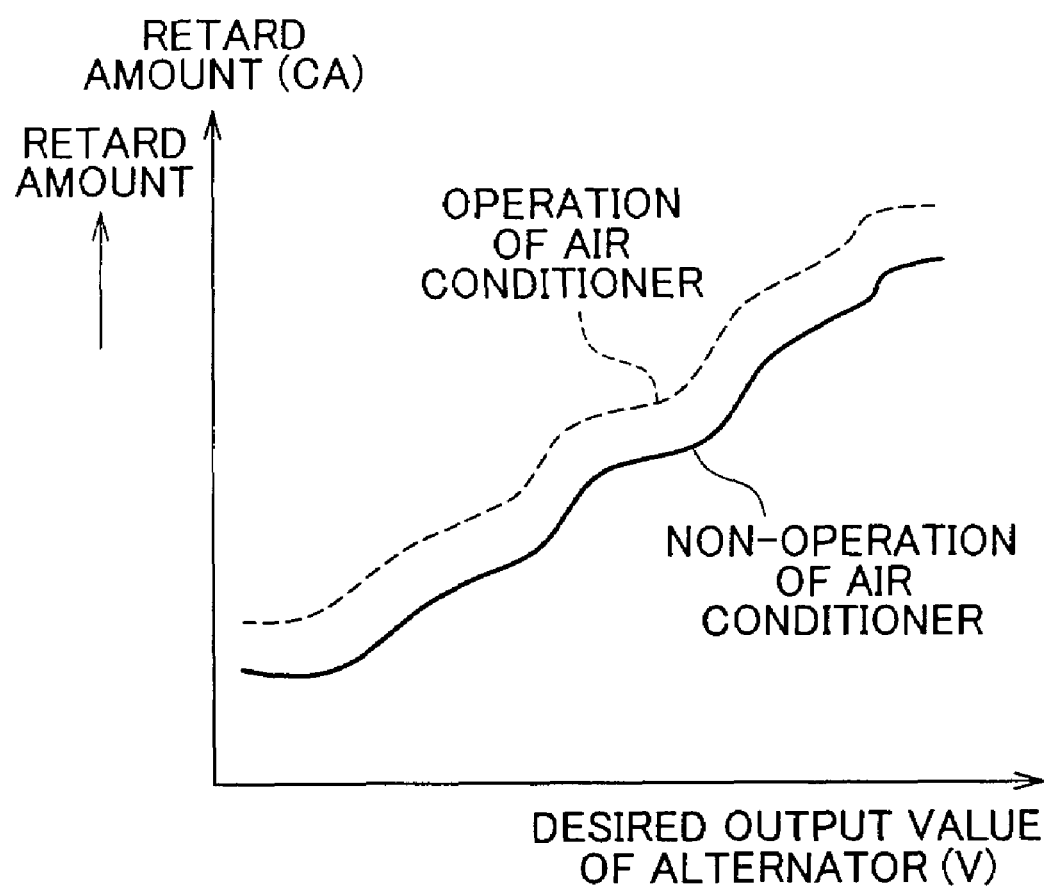
FIG. 4 is a view illustrating the correlation between a desired output value of an alternator before satisfaction of an idling stop condition and a retard amount of ignition timing, which correlation is decided by an ignition-timing retard amount decision map.

Specifically, the heavier the loads on the engine 1 prior to satisfaction of the idling stop control, the greater the ignition timing retard amount indicated by the ignition timing retard amount decision map will be. Referring to FIG. 4, the solid line represents the correlation between the power generation voltage (desired output value) of the alternator 91 before satisfaction of the idling stop condition and the retard amount of the ignition timing (when the air conditioner is not operated), which correlation is decided by the ignition timing retard amount decision map. In this way, the ignition timing retard amount is decided in such a way that it is generally proportional to the desired output value of the alternator 91 before satisfaction of the idling stop condition. The broken line in FIG. 4 shows the correlation between the power generation voltage (desired output value) of the alternator 91 before satisfaction of the idling stop condition and the ignition timing retard amount (when the air conditioner is operated) (i.e., the load of the compressor 92 acts against the engine 1) before satisfaction of the idling stop condition, which correlation is decided by the ignition timing retard amount decision map. As can be seen from the graphs in FIG. 4, when the air conditioner is operated, the ignition timing retard amount is greater than the retard amount when the air conditioner is not operated (in case of the solid line) because the load on the engine is greater when the air conditioner is operation that when the air conditioner is not operated.

By setting the retard amount of the ignition timing as described above, it is possible to avoid any rapid increase in the engine speed (acceleration of the engine) even when the engine loads are removed with the piston stop position control operation.

Figure 5:
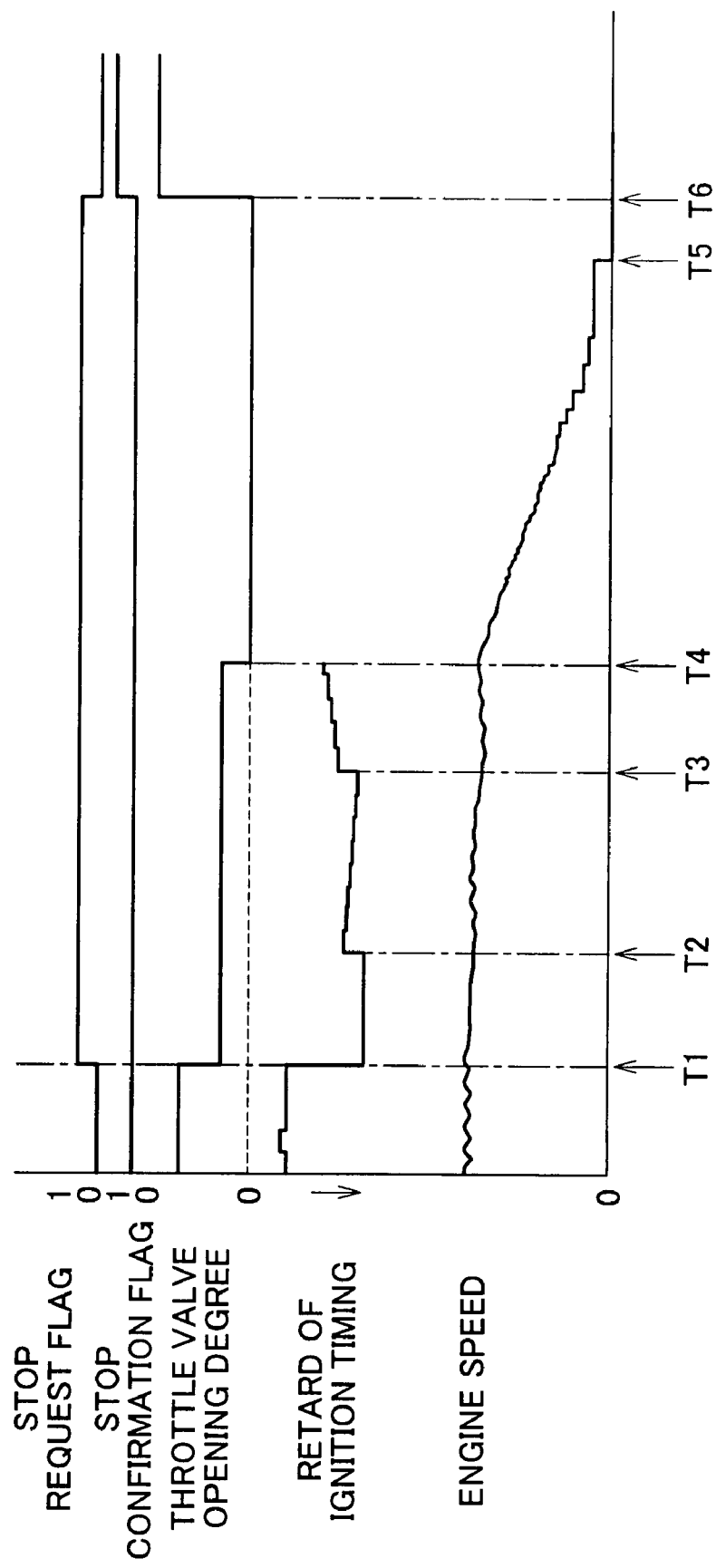
FIG. 5 is a time chart showing changes in an opening degree of a throttle valve, ignition timing and an engine speed during an idling stop control.
Figure 6:
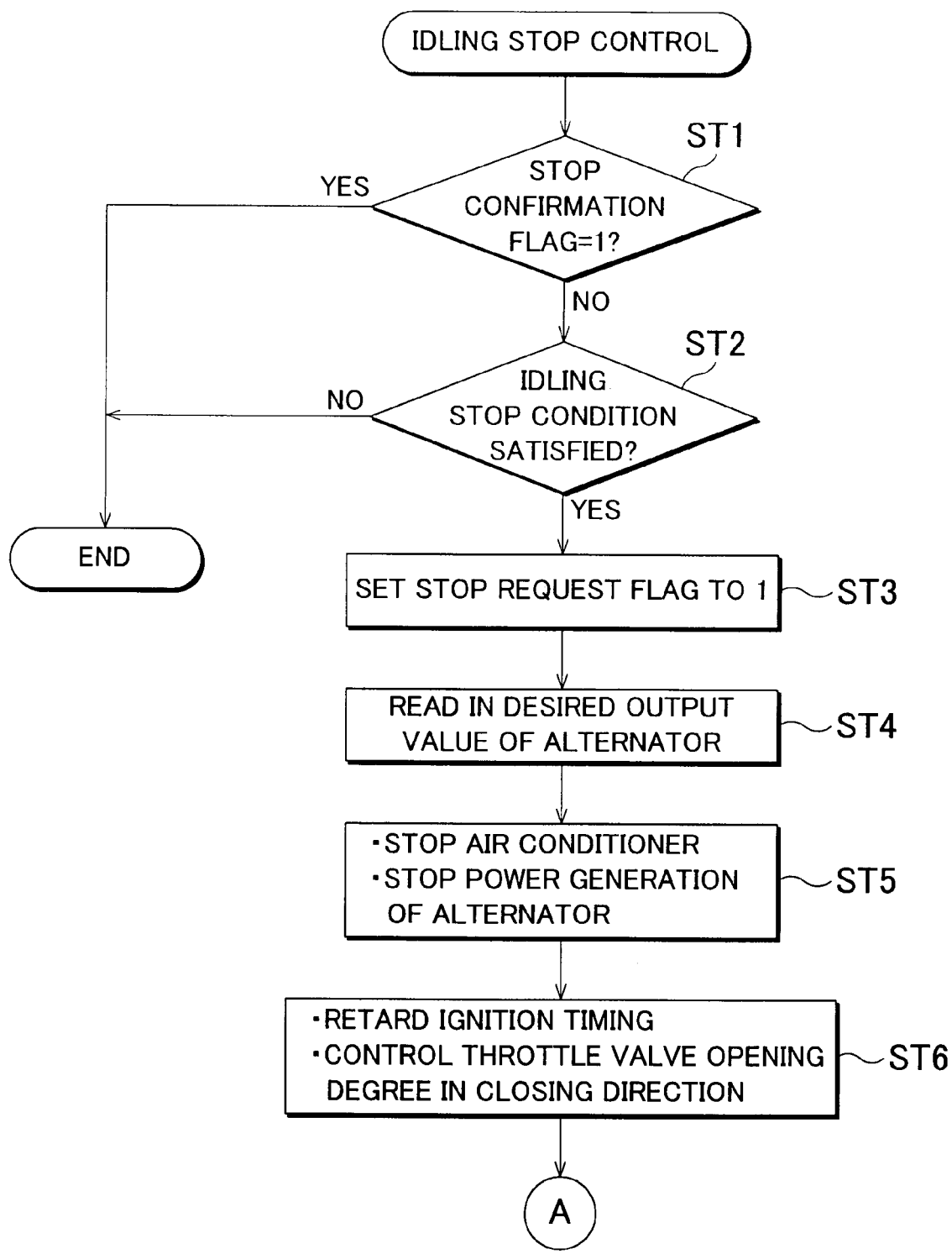

Next, the piston stop position control will be described in detail with reference to FIGS. 5 to 7. FIG. 5 shows changes in the opening degree of the throttle valve 36, the ignition timing of the ignition plug 2 and the engine speed during the idling stop control. FIGS. 6 and 7 are a flowchart illustrating the sequence of the idling stop control. In the idling stop control, a stop request flag is set to "1" when idling stop condition is satisfied during operation of the engine 1 and a stop confirmation flag that is set to "1" when the engine 1 is stopped in response to the satisfaction of the idling stop condition. Hereinafter, description will be given to a case where the air conditioner is being operated (the load of the compressor 92 is acting on the engine 1) prior to the satisfaction of the idling stop condition.

First, it is determined in step ST1 whether the stop confirmation flag is "1", i.e., whether the engine 1 is kept stopped by the idling stop control at the present time. If the determination is YES, i.e., it is determined that the engine 1 is in the idling stop condition, the control operation is terminated. On the other hand, if the determination is NO, i.e., it is determined that the engine 1 is in operation, the process proceeds to step ST2 where it is determined whether the idling stop condition is satisfied. If the determination in step ST2 is NO, the control operation is terminated and operation of the engine 1 continues. On the other hand, if the determination is YES, i.e., it is determined that the idling stop condition is satisfied, the process proceeds to step ST3 where the stop request flag is set to "1". In step ST4, the desired output value of the alternator 91 at the present time (the current power generation voltage) is read in and stored (a load recognizing operation by a load recognition unit).

Then, the process proceeds to step ST5 where the load of the air conditioner acting on the engine 1 is made zero by forcibly disengaging the clutch mechanism of the compressor 92 of the air conditioner (the air conditioner is stopped). Furthermore, the alternator 91 is substantially inhibited from generating the electric power and the power generation load acting against the engine 1 is made zero, by making the engine ECU 6 send a "power generation cut" command to the alternator drive circuit and by keeping a power generation voltage (desired output value) at a value (e.g., 10 V) below the charging voltage value in the battery 100 (power generation cut).

Substantially at the same time as when the air conditioner is stopped and the power generation cut (removal of the loads by a load control unit), the ignition timing of the ignition plug 2 is retarded and the throttle motor 36a is driven to reduce the opening degree of the throttle valve 36 (step ST6). Specifically, based on the desired output value of the alternator 91 read in step ST4, the retard amount of the ignition timing (the retard amount found by using the broken line graph in FIG. 4) is decided by use of the ignition timing retard amount decision map, thereby performing a retard control for the ignition plug 2 (a retarding operation by an ignition timing control unit). This forcibly reduces the output power of the engine 1, thus avoiding any rapid increase in the engine speed (any acceleration of the engine) that would otherwise be caused by the load removal, i.e., the air conditioner stoppage and the power generation cut.

When the air conditioner is not operated (the load of the compressor 92 does not act on the engine 1) before the satisfaction of the idling stop condition, the retard amount of the ignition timing determined using the ignition timing retard amount decision map is equal to the amount found by using the solid line graph in FIG. 4.

Referring to FIG. 5, at time T1, the air conditioner is stopped and the generation of electricity is cut when the idling stop condition is satisfied. Concurrently, a retard control for the ignition plug 2 and an opening degree reduction control for the throttle valve 36 are executed. Taking a specific example of the retard control for the ignition plug 2, the ignition timing is changed from 15 crank angle degrees before the piston top dead center to 5 crank angle degrees after the piston top dead center. In performing the opening degree reduction control for the throttle valve 36, the opening degree is reduced from 2 degrees to 1 degree in the opening direction on the basis of a complete close position. This ensures that the engine speed (e.g., 800 rpm) before and after the air conditioner is stopped and the generation of electricity is cut remains the same, thus avoiding occurrence of the rapid increase in the engine speed.

In this way, after the air conditioner is stopped and the generation of electricity is cut, and the accompanying retard control of the ignition timing and the closing control of the throttle valve opening degree are initiated, the process proceeds to step ST7 where it is determined whether the engine speed NE has been reduced to a value for triggering an automatic stop operation in the range of, e.g., 620 rpm to 650 rpm. This value is a target idle speed when there is no electrical load on the engine 1 and the piston stop position can be set at a proper position by executing the ignition cut and the fuel cut at this idle speed. The target idle speed is not limited to this value, and may be properly set depending on, e.g., the specifications of the engine 1 (the number of cylinders, an engine displacement and the like).

The engine speed adopted in this idling stop control (the engine speed used in determining whether or not the automatic stop operation triggering speed has been reached) is a speed available at the timing when the engine speed becomes greatest during the expansion strokes of the respective cylinders. For example, the engine speed is determined based on the rotation speed at about 90 crank angle degrees after the piston top dead center during the expansion strokes of the respective cylinders (the rotation speed calculated by recognizing, from the output signal of the crank angle sensor 76, the time required for the crankshaft to rotate at a predetermined crank angle degree). Then, it is determined whether the determined engine speed has been reduced to the range of the automatic stop operation triggering speed (620 rpm to 650 rpm).

If the determination in step ST7 is NO, the process proceeds to step ST8 where it is determined whether the engine speed still exceeds 650 rpm. If the determination is YES, the ignition timing is further retarded to thereby reduce the engine speed (step ST9). However, if the determination is NO, i.e., the engine speed is already below 620 rpm, the ignition timing is advanced to thereby increase the engine speed to the range of 620 rpm to 650 rpm (step ST10).

The reason for performing the operation described above is because the determination of whether the engine speed has reached the automatic stop operation triggering speed is carried out using the rotation speed available when the speed is greatest during the expansion strokes of the respective cylinders. That is, when the rotation speed of the engine 1 changes rapidly, there is a possibility that the engine speed detected does not fall within, but may be dropped below, the range of the automatic stop operation triggering speed (620 rpm to 650 rpm). For example, it is possible that the detected engine speed at one time point is 655 rpm and is 615 rpm at the next time point. In this situation, it is impossible to obtain the condition for the ignition cut and the fuel cut. For this reason, if such a situation occurs, the ignition timing of the ignition plug 2 is advanced to thereby increase the engine speed, and the ignition cut and the fuel cut are initiated at the moment when the engine speed reaches the automatic stop operation triggering speed.

Figure 8A:
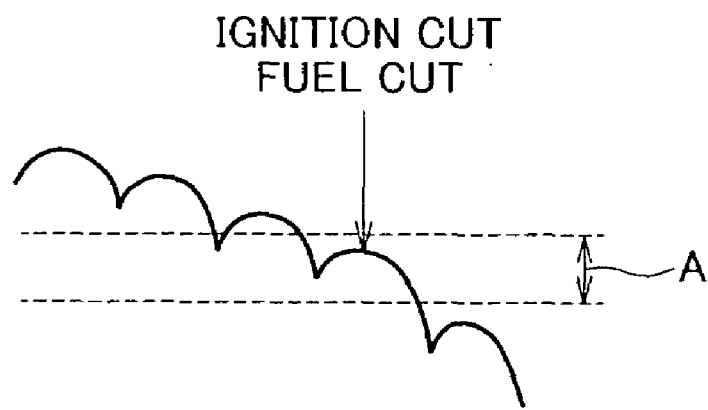
FIG. 8A shows a change in an engine speed in case of the engine speed being decreased to an automatic stop operation triggering speed solely by an ignition timing retard control.
Figure 8B:
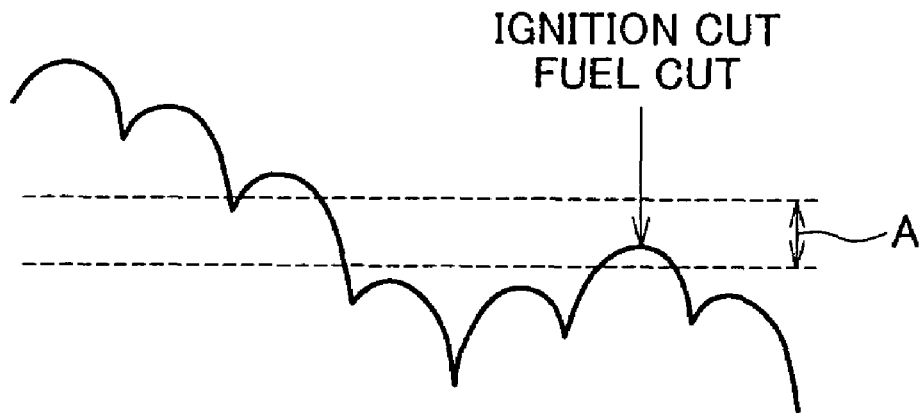
FIG. 8B illustrates a change in the engine speed in case of the engine speed being decreased to below the automatic stop operation triggering speed by the ignition timing retard control.
Figure 9:
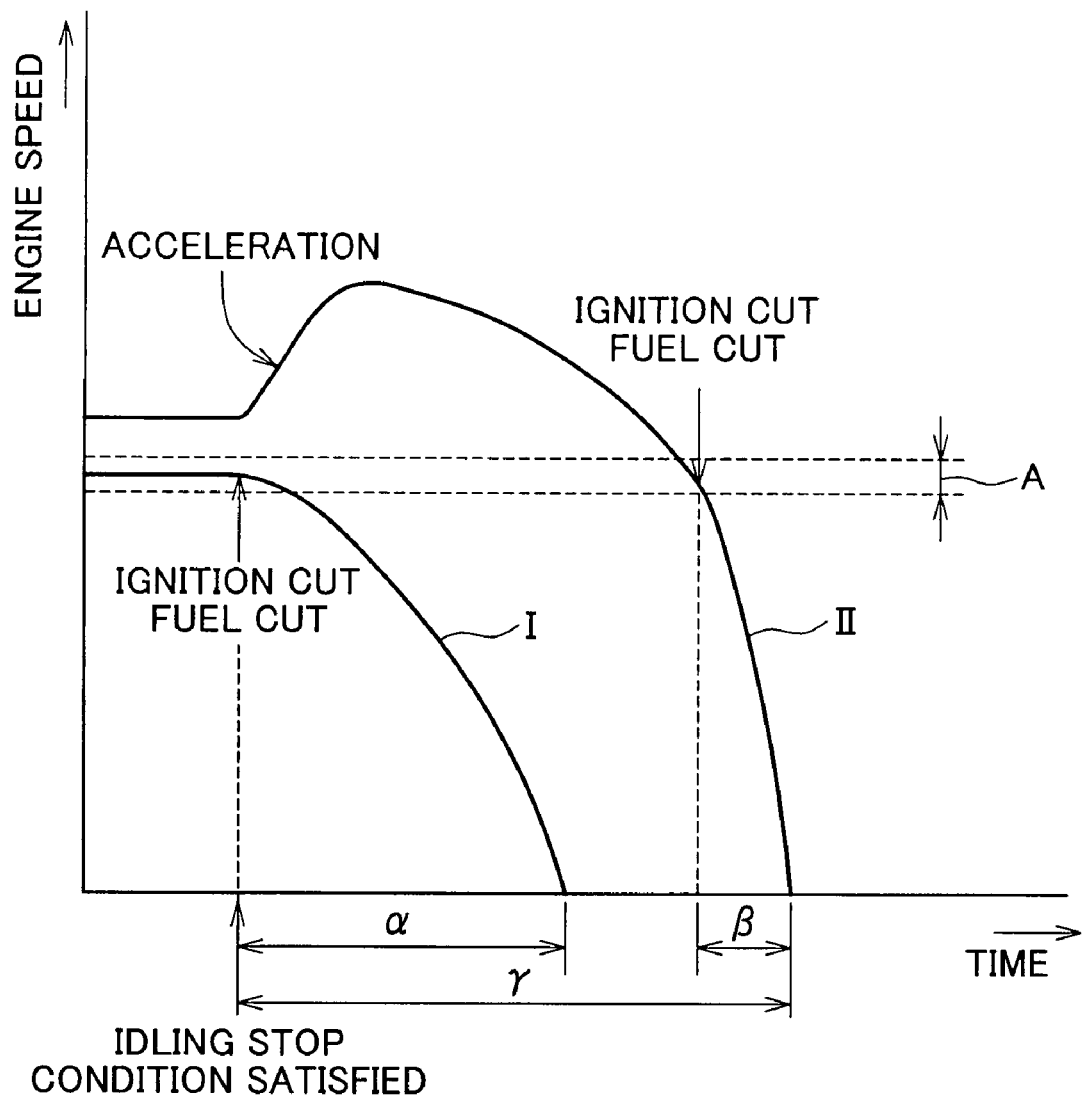
FIG. 9 is a view for explanation of a problem to be solved by the present invention, showing changes in an engine speed at the time of conducting a piston stop position control.

FIG. 8A shows a change in the engine speed when the engine speed is decreased to the automatic stop operation triggering speed (the range "A" in the figure) solely by the ignition timing retard control and the ignition cut and the fuel cut are started. FIG. 8B illustrates a change in the engine speed when the engine speed is decreased below the automatic stop operation triggering speed (i.e., below the range "A") by the ignition timing retard control, and then the engine speed is increased to the automatic stop operation triggering speed by advancing the ignition timing and the ignition cut and the fuel cut are started.

Referring again to FIG. 5, because the engine speed falls below 620 rpm at time T2 and time T3, the engine speed is increased by advancing the ignition timing.

In this way, if the engine speed reaches the indicated range (620 rpm to 650 rpm) by adjusting the ignition timing (YES in step ST7) the process proceeds to step ST11. In step ST11, ignition operation of the ignition plug 2 is stopped for the cylinder whose ignition timing comes just after the YES determination in step ST7 has been rendered. Similarly, ignition operation is stopped for the cylinders whose ignition timings come subsequently. Then, in the next intake stroke of the cylinder for which the ignition operation is first stopped, fuel injection of the injector 5 is cut off to ensure that no fuel is introduced into that cylinder (step ST12). Similarly, fuel injection of the injector 5 is cut off for the cylinders whose intake strokes come subsequently (automatic stop operation by an automatic stop unit). That is, in the respective cylinders, the ignition cut is first conducted and then the fuel cut follows. Thus, the engine stop operation begins and the engine speed decreases. Substantially at the same moment as commencement of the ignition cut and the fuel cut, the throttle valve 36 is completely closed (step ST13).

Referring again to FIG. 5, the ignition cut, the fuel cut and the throttle complete closure are made at time T4.

As the ignition and fuel are cut and the throttle valve is closed completely in the manner described, the engine speed decreases. If a zero engine speed (engine stall) is detected in step ST14 (if the determination in step ST14 is YES), the process proceeds to step ST15 where the stop request flag is set to "0" and the stop confirmation flag is set to "1", thereby terminating the idling stop control.

Referring again to FIG. 5, the engine 1, is stopped at time T5, and the stop confirmation flag is set to "1" while the stop request flag is set to "0" at time T6. Concurrently, the throttle valve 36 is opened in preparation for engine restart.

Subsequently, the engine restart operation described above is performed when the engine start condition is satisfied. In the engine 1 of the present embodiment, if the engine start condition is satisfied in the middle of the idling stop control (under the condition that the engine 1 is not yet completely stopped), the starter motor 81 is actuated and the engine 1 is started by engine cranking, without waiting for the engine 1 to completely stop.

As set forth above, in the present embodiment, when the idling stop condition is satisfied, acceleration of the engine 1 may be suppressed by removing the loads (an electrical load and the like) placed on the engine 1, retarding the ignition timing of the ignition plug 2 and properly setting the retard amount of the ignition timing depending on the magnitude of the loads. Accordingly, the automatic stop operation may be performed while the rotation speed of the engine 1 is stabilized, thereby reducing the amount of time needed to stop the engine 1 at a proper piston stop position. Thus, the task of restarting the engine 1 can be completed without generating a great deal of vibration within a short period of time.

The foregoing embodiment describes the application of the present invention to a port-injection engine in which the injector 5 injects fuel in the intake port 12a. However, the present invention is not limited thereto but may be applied to an in-cylinder direct injection engine.

Furthermore, although there has been described in the aforementioned embodiment a case where the present invention is applied to a four-cylinder engine, the present invention is not limited thereto but may be applied to other engines having any number of cylinders, e.g., a six-cylinder engine. Moreover, the engine to which the present invention may be applicable is not restricted to a motor vehicle engine.

The present invention may also be applied to a case where, in a so-called "hybrid car" equipped with an engine and an electric driving motor and adapted to run with a drive power of one or both of the engine and the electric driving motor, an engine may be automatically stopped during the running of the car (the vehicle is run using only the power from the electric driving motor and/or a regenerative operation is started). Thus, the appropriate piston stop position may be set while the vehicle runs, thereby assuring enhanced restartability when the engine is restarted while the vehicle runs.

Although the piston stop position of a cylinder in an intake stroke is set near a top dead center in the foregoing embodiment, the optimal piston stop position sought in the present invention is not limited thereto because the appropriate piston stop position may vary with the specifications of the engine or the like.

In the foregoing embodiment, when the idling stop condition is satisfied, engine loads are removed by stopping operation of the air conditioner and power generation of the alternator 91. However, the present invention is not limited thereto and the engine loads caused by other devices may also be removed. Reducing the engine loads rather than complete removal of the engine loads also falls within the scope of the present invention.

While the invention has been shown and described with respect to the preferred embodiments, it will be understood by those skilled in the art that various changes and modifications may be made without departing from the scope of the invention as defined in the following claims.

What is claimed is:

1. An automatic stop device for an internal combustion engine that executes an automatic internal combustion engine stop control to stop the operation of the internal combustion engine after a predetermined automatic stop condition is satisfied, comprising:
   a load control unit that removes a load on the internal combustion engine or reduces the load to a predetermined level when the automatic stop condition is satisfied;
   a load recognition unit that recognizes a magnitude of the load acting on the internal combustion engine before the load is removed or reduced by the load control unit; and
   an ignition timing control unit, upon the satisfaction of the automatic stop condition, that calculates a difference between the magnitude of the load on the internal combustion engine before and after the automatic stop condition is satisfied in accordance with the magnitude of the load on the internal combustion engine, selects an ignition timing retard amount of an ignition plug such that the retard amount is increased the greater the difference between the magnitude of the load before and after the automatic stop condition is satisfied, and retards the ignition timing of the ignition plug by the retard amount at substantially the same moment as the load removing operation or the load reducing operation is executed by the load control unit, before the automatic stop control is initiated.

2. The automatic stop device according to claim 1, further comprising a throttle control unit that reduces an intake air quantity by decreasing an opening degree of a throttle valve at the same time as the ignition timing control unit starts retarding the ignition timing of the ignition plug.

3. The automatic stop device according to claim 1, wherein the internal combustion engine is installed in a motor vehicle that performs an idling stop control to automatically stop the internal combustion engine when an idling stop condition is satisfied during stoppage of the motor vehicle.

4. An internal combustion engine for a vehicle, comprising:
   an automatic stop device for an internal combustion engine that executes an automatic internal combustion engine stop control to stop the operation of the internal combustion engine after a predetermined automatic stop condition is satisfied, comprising:
      a load control unit that removes a load on the internal combustion engine or reduces the load to a predetermined level when the automatic stop condition is satisfied;
      a load recognition unit that recognizes a magnitude of the load acting on the internal combustion engine before the load is removed or reduced by the load control unit; and
      an ignition timing control unit, upon the satisfaction of the automatic stop condition, that calculates a difference between the magnitude of the load on the internal combustion engine before and after the automatic stop condition is satisfied in accordance with the magnitude of the load on the internal combustion engine, selects an ignition timing retard amount of an ignition plug such that the retard amount is increased the greater the difference between the magnitude of the load before and after the automatic stop condition is satisfied, and retards the ignition timing of the ignition plug by the retard amount at substantially the same moment as the load removing operation or the load reducing operation is executed by the load control unit, before the automatic stop control is initiated,
   wherein, when an internal combustion engine restart condition is satisfied after the internal combustion engine is stopped by the automatic stop device, fuel is supplied to an initial combustion target cylinder in an intake stroke in the stop condition and the ignition operation of the ignition plug is started when the cylinder performs an expansion stroke.

5. An automatic stop device that stops an internal combustion engine by stopping an ignition operation of an ignition plug and by cutting off a fuel supply after a predetermined automatic stop condition is satisfied, comprising:
   a load control unit that removes a load on the internal combustion engine when the automatic stop condition is satisfied;
   a load recognition unit that recognizes a magnitude of the load acting on the internal combustion engine before the load is removed by the load control unit;
   an ignition timing control unit, upon the satisfaction of the automatic stop condition, that selects an ignition timing retard amount of the ignition plug such that the retard amount is increased the greater the magnitude of the load on the internal combustion engine, recognized by the load recognition unit, before the satisfaction of automatic stop condition is satisfied, and retards the ignition timing of the ignition plug by the retard amount at substantially the same moment the load removing operation is executed by the load control unit; and an automatic stop unit that stops the internal combustion engine by stopping the ignition operation of the ignition plug and by cutting off the fuel supply when a speed of the internal combustion engine reaches a predetermined automatic stop operation triggering speed through the retarding of the ignition timing of the ignition plug by the ignition timing control unit.

6. The automatic stop device according to claim 5, wherein the automatic stop unit first stops the ignition operation of the ignition plug and then cuts off the fuel supply when the speed of the internal combustion engine reaches the predetermined automatic stop operation triggering speed through the retarding operation of the ignition timing of the ignition plug by the ignition timing control unit.

7. The automatic stop device according to claim 5, wherein the internal combustion engine is a multi-cylinder internal combustion engine, and wherein the automatic stop unit stops the ignition operation of the ignition plug and cut off the fuel supply such that, when the internal combustion engine is stopped, a piston in a cylinder in an intake stroke is stopped near a top dead center.

8. The automatic stop device according to claim 5, wherein the automatic stop unit stops the ignition operation of the ignition plug and cuts off the fuel supply when a speed of the internal combustion engine detected at predetermined intervals reaches the predetermined automatic stop operation triggering speed, wherein the ignition timing control unit advances the ignition timing of the ignition plug and increases the speed of the internal combustion engine if the speed of the internal combustion engine detected at the predetermined intervals decreases below the automatic stop operation triggering speed without being the automatic stop operation triggering speed, and wherein the automatic stop unit stops the internal combustion engine by stopping the ignition operation of the ignition plug and by cutting off the fuel supply, when the increased speed of the internal combustion engine reaches the automatic stop operation triggering speed.

9. The automatic stop device according to claim 5, further comprising a throttle control unit that reduces an intake air quantity by decreasing an opening degree of a throttle valve at the same time as the ignition timing control unit starts retarding the ignition timing of the ignition plug.

10. The automatic stop device according to claim 5, wherein the internal combustion engine is installed in a motor vehicle that performs an idling stop control to automatically stop the internal combustion engine when an idling stop condition is satisfied during stoppage of the motor vehicle.

11. An internal combustion engine for a vehicle, comprising:

an automatic stop device that stops an internal combustion engine by stopping an ignition operation of an ignition plug and by cutting off a fuel supply after a predetermined automatic stop condition is satisfied, comprising:
a load control unit that removes a load on the internal combustion engine when the automatic stop condition is satisfied;
a load recognition unit that recognizes a magnitude of the load acting on the internal combustion engine before the load is removed by the load control unit;
an ignition timing control unit, upon the satisfaction of the automatic stop condition, that selects an ignition timing retard amount of the ignition plug such that the retard amount is increased the greater the magnitude of the load on the internal combustion engine, recognized by the load recognition unit, before the satisfaction of automatic stop condition is satisfied, and retards the ignition timing of the ignition plug by the retard amount at substantially the same moment the load removing operation is executed by the load control unit; and
an automatic stop unit that stops the internal combustion engine by stopping the ignition operation of the ignition plug and by cutting off the fuel supply when a speed of the internal combustion engine reaches a predetermined automatic stop operation triggering speed through the retarding of the ignition timing of the ignition plug by the ignition timing control unit,
wherein, when an internal combustion engine restart condition is satisfied after the internal combustion engine is stopped by the automatic stop device, fuel is supplied to an initial combustion target cylinder in an intake stroke in the stop condition and the ignition operation of the ignition plug is started when the cylinder performs an expansion stroke.

12. An automatic stop method for an internal combustion engine that executes an automatic internal combustion engine stop control to stop the operation of an internal combustion engine after a predetermined automatic stop condition is satisfied, comprising:

removing a load on the internal combustion engine or reducing the load to a predetermined level when the automatic stop condition is satisfied;

recognizing a magnitude of the load acting on the internal combustion engine before the load is removed or reduced;

calculating a difference between the magnitude of the load on the internal combustion engine before and after the automatic stop condition is satisfied in accordance with the magnitude of the load on the internal combustion engine;

selecting an ignition timing retard amount of an ignition plug such that the retard amount is increased the greater the difference between the magnitude of the load before and after the automatic stop condition is satisfied; and retarding the ignition timing of the ignition plug by the retard amount at substantially the same moment as the load removing operation or the load reducing operation is executed, before the automatic stop control is initiated.

13. The automatic stop method according to claim 12, further comprising reducing an intake air quantity by decreasing an opening degree of a throttle valve at the same time as the retarding of the ignition timing of the ignition plug is started.

14. The automatic stop method according to claim 12, wherein the internal combustion engine is installed in a motor vehicle that performs an idling stop control to automatically stop the internal combustion engine when an idling stop condition is satisfied during stoppage of the motor vehicle.

15. An automatic stop method for automatically stopping an internal combustion engine by stopping an ignition operation of an ignition plug and by cutting off a fuel supply after satisfaction of a predetermined automatic stop condition for the internal combustion engine, comprising:

removing a load on the internal combustion engine when the automatic stop condition is satisfied;

recognizing a magnitude of the load acting on the internal combustion engine before the load is removed;

selecting an ignition timing retard amount of the ignition plug such that the retard amount is increased the greater the magnitude of the load before the automatic stop condition is satisfied;

retarding the ignition timing of the ignition plug by the retard amount at substantially the same moment the load removing operation is executed; and stopping the internal combustion engine by stopping the ignition operation of the ignition plug and by cutting off the fuel supply when a speed of the internal combustion engine reaches a predetermined automatic stop operation triggering speed through the retarding of the ignition timing of the ignition plug.

16. The automatic stop method according to claim 15, wherein, the ignition operation of the ignition plug is stopped first and then the fuel supply is cut off, when the speed of the internal combustion engine reaches the predetermined automatic stop operation triggering speed through the retarding operation of the ignition of the ignition timing of the ignition plug.

17. The automatic stop method according to claim 15, wherein the internal combustion engine is a multi-cylinder internal combustion engine, and the ignition operation of the ignition plug is stopped and the fuel supply is cut off such that, when the internal combustion engine is stopped, a piston in a cylinder in an intake stroke is stopped near a top dead center.

18. The automatic stop method according to claim 15, wherein the ignition operation of the ignition plug is stopped and the fuel supply is cut off when a speed of the internal combustion engine detected at predetermined intervals reaches the predetermined automatic stop operation triggering speed, wherein the ignition timing of the ignition plug is advanced to increase the speed of the internal combustion engine if the speed of the internal combustion engine detected at predetermined intervals decreases below the automatic stop operation triggering speed without being the automatic stop operation triggering speed, and wherein the internal combustion engine is stopped by stopping the ignition operation of the ignition plug and by cutting off the fuel supply when the increased speed of the internal combustion engine reaches the automatic stop operation triggering speed.

19. The automatic stop method according to claim 15, further comprising reducing an intake air quantity by decreasing an opening degree of a throttle valve at the same time as the retarding of the ignition timing of the ignition plug is started.

20. The automatic stop method according to claim 15, wherein the internal combustion engine is installed in a motor vehicle that performs an idling stop control to automatically stop the internal combustion engine when an idling stop condition is satisfied during stoppage of the motor vehicle.

21. An automatic stop device for an internal combustion engine that executes an automatic internal combustion engine stop control to stop the operation of the internal combustion engine after a predetermined automatic stop condition is satisfied, comprising:

load control means for removing a load on the internal combustion engine or reducing the load to a predetermined level when the automatic stop condition is satisfied;

load recognition means for recognizing a magnitude of the load acting on the internal combustion engine before the load is removed or reduced by the load control means; and ignition timing control means, upon the satisfaction of the automatic stop condition, for calculating a difference between the magnitude of the load on the internal combustion engine before and after the automatic stop condition is satisfied in accordance with the magnitude of the load on the internal combustion engine, selecting an ignition timing retard amount of an ignition plug such that the retard amount is increased the greater the difference between the magnitude of the load on the internal combustion engine before and after the automatic stop condition is satisfied, and retarding the ignition timing of the ignition plug by the retard amount at substantially the same moment as the load removing operation or the load reducing operation is executed by the load control means, before the automatic stop control is initiated.

22. An automatic stop device that stops an internal combustion engine by stopping an ignition operation of an ignition plug and by cutting off a fuel supply after a predetermined automatic stop condition is satisfied, comprising:

load control means for removing a load on the internal combustion engine when the automatic stop condition is satisfied;

load recognition means recognizing a magnitude of the load acting on the internal combustion engine before the load is removed by the load control means;

ignition timing control means, upon the satisfaction of the automatic stop condition, for selecting an ignition timing retard amount of the ignition plug such that the retard amount is increased the greater the magnitude of the load on the internal combustion engine, recognized by the load recognition means, before the satisfaction of automatic stop condition is satisfied, and retarding the ignition timing of the ignition plug by the retard amount at substantially the same moment the load removing operation is executed by the load control means; and automatic stop means for stopping the internal combustion engine by stopping the ignition operation of the ignition plug and by cutting off the fuel supply when a speed of the internal combustion engine reaches a predetermined automatic stop operation triggering speed through the retarding of the ignition timing of the ignition plug by the ignition timing control means.

* * * * *